UNITED STATES PATENT OFFICE.

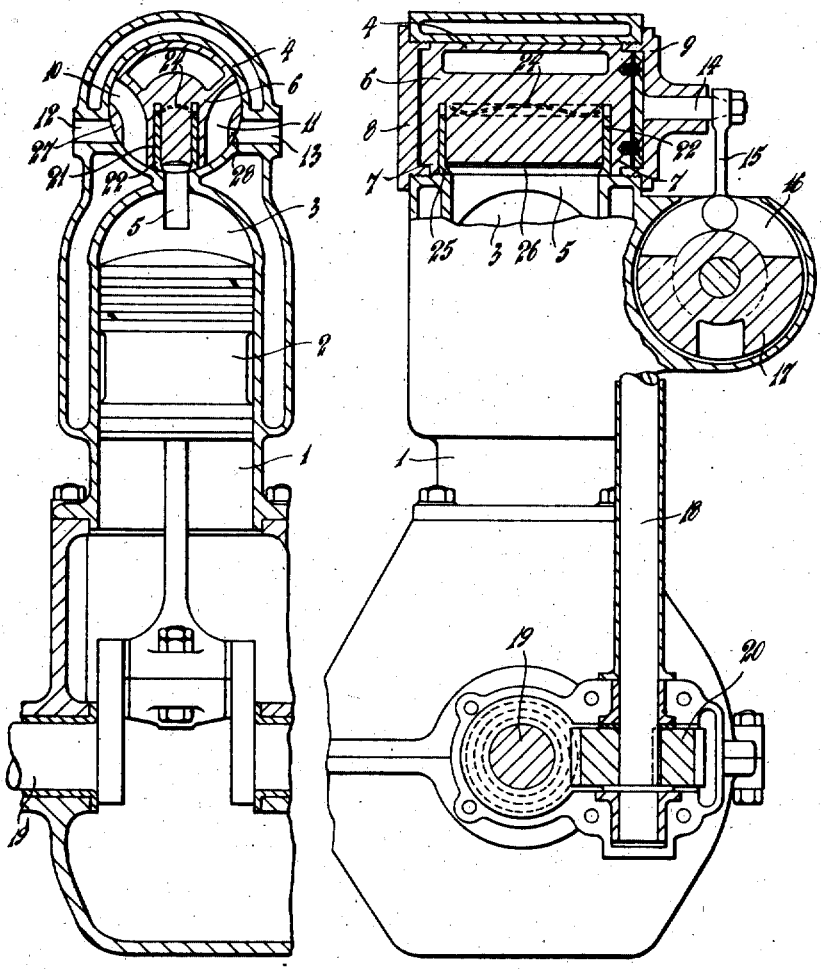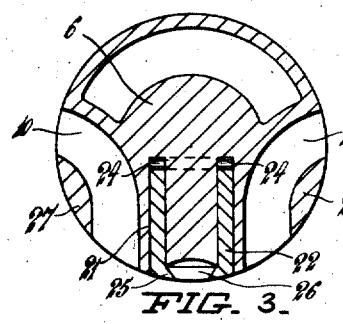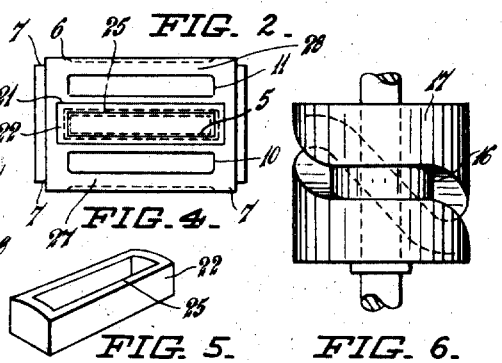

DANIEL JAMES SWEETZER, OF AUCKLAND, NEW ZEALAND.

VALVE FOR INTERNAL-COMBUSTION ENGINES.

1,249,689.  —Specification of Letters Patent.  Patented Dec. 11, 1917.

Application filed July 9, 1915.  Serial No. 38,906.

*To all whom it may concern:*

Be it known that I, DANIEL JAMES SWEETZER, a citizen of the Dominion of New Zealand, and residing at 16 Prospect Terrace, Mount Eden, Auckland, in the provincial district of Auckland, in the Dominion of New Zealand, have invented certain new and useful Improvements in Valves for Internal-Combustion Engines, of which the following is a specification.

This invention relates to an improved construction of cylindrical valve for internal combustion engines whereby the efficiency of such valves is increased.

The details of the invention will be described by the aid of the accompanying drawings wherein:—

Figure 1, is a longitudinal sectional elevation, and

Fig. 2, an end elevation partly in section of an engine fitted with the valve.

Fig. 3, is a sectional elevation of the valve,

Fig. 4, is an inverted view of the valve,

Fig 5, an inverted perspective view of the packing piece,

Fig. 6, a plan of the cam.

The working cylinder 1 is fitted with a piston 2 and has a combustion chamber 3 surmounted by a valve casing 4, a port 5 forms a communication between the combustion chamber 3 and the valve casing 4. The valve casing 4 is cylindrical and a valve 6 fits therein.

The ends 7 of the valve 6 are also cylindrical and have a working fit within the casing and in recesses formed in the covers 8 and 9 of the valve casing.

Cavities or ports 10 and 11 are made in the valve 6 and have a length approximately corresponding with the port 5.

The inlet 12 is connected to the carbureter or other means for supplying an explosive charge. The outlet 13 is connected to the exhaust pipe.

The spindle 14 of the valve 6 has an arm 15 the end of which is engaged by a groove 16 in a cam 17.

The cam is driven by means of a shaft 18 from the main shaft 19 of the engine, any suitable skew bevel or chain gear 20 being employed between the shafts.

The valve 6 is provided with a deep groove 21 of rectangular configuration and of such size that it is adapted to completely surround the port 5. In Fig. 2, the port 5 is indicated by dotted lines and surrounded by the packing groove 21.

Within the groove 21 is fitted a rectangular packing piece 22 which is capable of sliding movement so that it may be projected radially from the valve. Leaf springs 24 tend to project the packing piece 22 from the valve 6.

The packing piece 22 has an inward projection 25 which extends into or below a concavity 26 formed in the valve between the sides of the groove 21. When, therefore, the explosive charge is compressed and during the power stroke pressure is exerted against the cavity 26 the pressure is also exerted on the inward sides of the projection 25, thereby forcing the packing piece 22 tightly against the surface of the valve casing 4 and assisting the springs 24.

The packing piece is, therefore, adapted to prevent leakage from the port during compression and explosion strokes.

By providing the valve 6 with ports 10 and 11, shaped as shown in the drawings, shutters 27 and 28 are formed, which overlap the ports 12 and 13 simultaneously with the closing of the port 5 by the said valve 4. These shutters facilitate the lubrication and protect the walls of the valve chamber.

The possibility of communication taking place at wrong periods between the port 5 and the ports 12 and 13 is thus reduced to a minimum.

What I do claim and desire to secure by Letters Patent of the United States is:—

1. In an internal combustion engine, a cylindrical valve chamber having a combustion port, a cylindrical valve adapted to close the combustion chamber port, a rectangular packing piece in the valve fitting a groove of rectangular configuration and formed in one piece and undivided and an internal projection on and around the bottom edge of the packing piece and around a concavity in the valve, substantially as set forth.

2. In an internal combustion engine, a cylindrical valve chamber having inlet and exhaust ports, and a port leading to the combustion chamber, a cylindrical valve within said casing adapted at different points in its movement to place the inlet and exhaust ports in communication with the combustion chamber port and to close the latter, and a rectangular packing piece located in a rectangular groove in the valve and held by the pressure of the compressed gases against the wall of the valve chamber.

3. In an internal combustion engine, a cylindrical valve chamber having inlet and exhaust ports, and a port leading to the combustion chamber, a cylindrical valve within said casing adapted at different points in its movement to place the inlet and exhaust ports in communication with the combustion chamber port and to close the latter, and a rectangular packing piece located in a rectangular groove in the valve and held by the pressure of the compressed gases against the wall of the valve chamber during the compression and exhaust strokes of the engine.

4. In an internal combustion engine, a cylindrical valve chamber having inlet and exhaust ports, and a port leading to the combustion chamber, a cylindrical valve within said casing adapted at different points in its movement to place the inlet and exhaust ports in communication with the combustion chamber port and to close the latter, a rectangular packing piece located in a rectangular groove in the valve, springs normally pressing the packing piece outwardly, and means on said packing piece operated by the pressure of the compressed gases for pressing the packing piece outwardly during the compression and explosion stroke.

5. In an internal combustion engine, a cylindrical valve chamber having inlet and exhaust ports, and a port leading to the combustion chamber, a cylindrical valve within said casing adapted at different points in its movement to place the inlet and exhaust ports in communication with the combustion chamber port and to close the latter, said valve having a part thereof of less radius than the remainder of the valve and a rectangular groove surrounding said part, and a rectangular packing piece located in the groove in the valve and having an internal projection acted on by the compressed gases to press the packing piece outwardly.

In testimony whereof I have signed my name to this specification in the presence of two witnesses.

DANIEL JAMES SWEETZER.

Witnesses:
SIDNEY GIBSON CHAPMAN,
ARTHUR LEWITT FERNEYHOUGH.